UNITED STATES PATENT OFFICE.

DAVID BARKER, OF NORTHFLEET, ENGLAND.

IMPROVEMENT IN THE MANUFACTURE OF ARTIFICIAL FUEL.

Specification forming part of Letters Patent No. 140,452, dated July 1, 1873; application filed May 16, 1873.

*To all whom it may concern:*

Be it known that I, DAVID BARKER, of Northfleet, in the county of Kent, England, have invented certain Improvements in the Manufacture of Artificial Fuel, of which the following is a specification:

My said invention has for its object the treatment and utilization of coal, whether anthracite or non-bituminous, or bituminous, or lignite, peat, or other similar carbonaceous substances, coke, charcoal, and other carbonaceous substances, when in a state of powder or fine division, so as to produce a solid and smokeless, or comparatively smokeless, fuel especially adapted for smelting iron and other metals, and also for other purposes in which the fuel has to bear a great burden at a high temperature, and which fuel will bear such burden and temperature without "falling" or becoming disintegrated.

I will first describe the method of manufacturing my improved fuel when coke is, in the first instance, employed. The coke, which is prepared in the manner already well known and understood, having been reduced to a state of powder or very fine division by any suitable means or apparatus adapted for the purpose, is mixed in a suitable pug or mixing mill in the proportion of one pound of the coke with two ounces of the mucilage or liquid hereinafter mentioned. The mixture thus made is exposed to heat and molded into blocks by means of any suitable apparatus adapted for the purpose. The blocks are then placed in a retort and exposed to the influence of heat in order to evaporate the liquid or moisture contained therein, or a sufficient part thereof, when the blocks will become perfectly solid and fit for the purposes above referred to.

When anthracite or other coal or carbonaceous matter is treated for the purposes of my said invention, the same is prepared as before described with reference to the treatment of coke-dust, and then formed into blocks and coked; or the same is coked without any admixture of the before-mentioned mucilage or liquid. In either case the coke thus produced is ground or reduced to a state of dust or fine division, and is then mixed, in the same proportions as before mentioned, with the said mucilage or liquid employed by me. The mixture thus formed is made into blocks, which are placed in retorts and exposed to heat in order to evaporate the moisture contained therein, or a sufficient part thereof, as before mentioned, this method of treatment being, in fact, equivalent to a recoking of the materials under treatment.

In some cases—as, for instance, when the fuel is to be used for ordinary purposes, in which great cohesion or capability of bearing a heavy burden is not required—the coal or other carbonaceous material is combined with the mucilage or liquid employed by me, as before mentioned, and then exposed to heat and formed into blocks without being subjected to the operation of coking.

I will now proceed to describe the way in which the mucilage or liquid is manufactured. I mix one part of farina from which the gluten has been removed, and which consists entirely, or almost entirely, of fecula or starch, with twenty parts of water, and then add thereto a solution of sulphate of alumina, or of chloride of alumina in hydrochloric acid, in the proportion of half an ounce per gallon. Although I employ, by preference, the farinaceous mucilage before described, any mucilage prepared by the mixture of any ordinary farinaceous substance with water may be used; and if the solution of sulphate of alumina, or of chloride of alumina, were used alone with water it would cause the coked or carbonaceous particles firmly to cohere; but such use would not be so advantageous as the use of the mixture or mucilage preferably employed by me. The mixture thus formed is conveyed into a tank heated by steam, and in which it is boiled, and then run off through a tap into a boiler, in which are placed pitch and carbolic acid in the proportion of eight parts of the former to two of the latter. The whole contents of the boiler are subjected to the operation of boiling under moderate pressure, as well understood, by which treatment the several substances contained in the boiler are caused to unite. Steam is then turned on into the boiler and the contents thereof forced through pipes into a tank, whence the liquid is conveyed, by means of elevators, to the pug or mixing mill or mills, in which it is mixed in sufficient quantity, as will be well understood, with the coke or coal or other carbonaceous material, which is conveyed in a powdered, broken, or disintegrated state, by a separate set of elevators, into the pug or mixing mill or mills. This is an operation which is carried out in the ordinary way hitherto used.

It should here be mentioned that the proportions of the several substances above mentioned are approximative only, as they may, and in many instances must, be varied according to the nature of the coal or carbonaceous material under treatment, as will be well understood, or soon ascertained by experience in the process, by persons acquainted with such operations and with the respective qualities of the coal or carbonaceous material employed. I should also observe that the proportion of carbolic acid above mentioned refers to pure carbolic acid, and that when impure sources or forms of that acid are employed corresponding quantities of the substance or vehicle containing the acid must be introduced into the boiler, as will be well understood.

The heat employed for heating the liquid when in the tank is fire heat, and also that of steam. The elevators are cased with sheet-iron and wood, and steam is introduced between them to keep the liquid from solidifying. A small furnace is placed under the pug-mill, into which furnace is introduced a hot-air pipe with a steam-coil around the same, and by which superheated steam is introduced into the pug-mill, a fan being also employed to draw hot air into the same.

I would observe, in conclusion, that I do not claim the use of the several substances hereinbefore mentioned in the manufacture of artificial fuel separately and apart from each other; neither do I claim any apparatus employed in such manufacture; but

What I claim is as follows:

1. The manufacture of my improved fuel by treating carbonaceous substances and combining with them the materials required to give the fuel cohesion, substantially as hereinbefore set forth and described.

2. The use of the solution of sulphate of alumina or of chloride of alumina in combination with carbonaceous matters prepared substantially in the manner and for the purposes above set forth.

DAVID BARKER.

Witnesses:
GEO. S. VAUGHAN,
54 *Chancery Lane, London.*
G. W. WESTLEY,
24 *Royal Exchange, London.*